Figure 1:
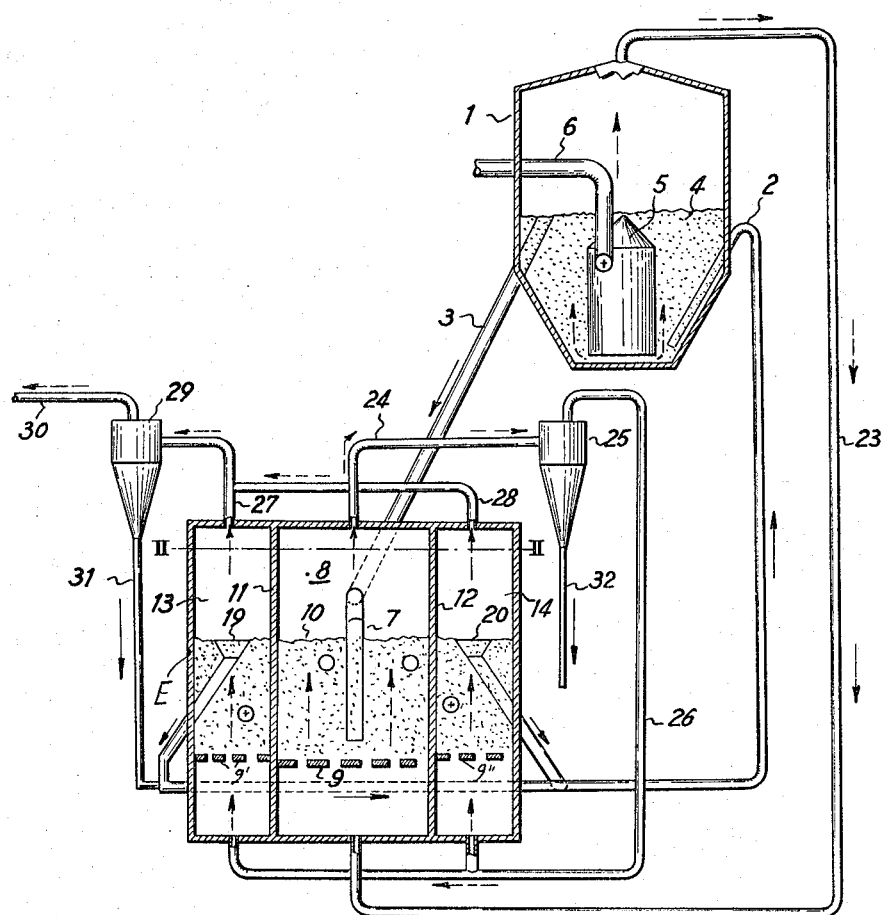

3,300,295
METHOD AND APPARATUS FOR ROASTING ORES

Michel Boucraut, Metz, and Imre Toth, Hy-Metz, France, assignors to Institut de Recherches de la Siderurgie, Francaise, Saint Germain-en-Laye, France
Filed May 11, 1964, Ser. No. 366,263
Claims priority, application France, May 14, 1963, 934,748, Patent 1,364,709
15 Claims. (Cl. 75—1)

It is well known that the process of magnetizing roasting of iron ores by fluidization comprises the step of fluidizing the ore at a temperature ranging between 600 and 700° C. in a mixture of flue gases, oxidizing gases and reducing gases.

In order to improve the thermal economy of this process it is known to use in various processes a portion of the heat carried by the gases and the ore as it leaves the bed where it is treated so as to raise the temperature of the ore to be treated in such a manner that one may say that the magnetizing roasting is most of the time effected in at least three phases: a phase of preheating the ore by heat exchange, a second phase of heating it and treating in a suitable atmosphere, and a third phase of cooling the ore by transferring part of its sensible heat to ores which are undergoing said first phase of treatment.

The above defined first and third phases of treatment are conventionally carried out in a heat exchanger. One conveys the cold ore pneumatically through a duct which extends across a bed of fluidized hot ore, or vice versa; sometimes one uses an auxiliary or intermediary fluid which circulates in a system of tubes which extend through two separate fluidization beds.

In the first case it is necessary to provide for a very great tube surface because the exchange of heat with materials which are being transported pneumatically is rather inefficient, and besides it is very difficult to assure an equal distribution of a flow of pulverulent substances through a bundle of tubes i.e., to utilize to maximum efficiency the available surface of the heat exchanger. In the second case the necessary installation is rather involved and consequently rather expensive.

It is an object of the present invention to improve the method of magnetizing roasting of ores by fluidization in such a manner that the thermal economy of the process and the reliability of the operation are improved while at the same time the necessary installations are simplified.

It is another object of this invention to provide for an apparatus which is suitable to carry out the improved method according to the invention.

With above objects in view the invention includes a method of roasting ores by fluidization, with the steps of establishing at least a first, a second and a third bed of pulverulent ore separate from each other, providing for separation between the first and third bed by a partition wall therebetween, introducing a continuous stream of hot gas successively into each of said beds for fluidizing and heating the pulverulent ore in the beds and for causing a flow of fluidized pulverulent ore at least in the first and third bed in substantially horizontal direction along the partition wall, causing heat exchange between the first and third beds across the partition wall, producing the stream of hot gas by at least partial combustion of a fuel at a predetermined point within the second one of the beds, and causing the fluidized pulverulent ore to flow from the first bed to the second bed and from the second bed to the third bed while introducing raw pulverulent ore into the first bed and removing roasted pulverulent ore from the third bed.

In another aspect the invention also includes an apparatus for roasting ore by fluidization, in combination, at least a first, a second and a third chamber separate from one another, each chamber including means for introducing the ore and means for removing the ore therefrom, the first and third chambers forming together a unitary enclosure divided by partition means, means for introducing a stream of hot gas successively into each of the chambers for fluidizing and heating the pulverulent ore therein and for conveying it through the chambers, particularly through the first and third chambers in a direction along the partition means, first duct means connecting the first chamber with the second chamber and connecting the second chamber with the third chamber for enabling the fluidized ore to flow from the first chamber through the second chamber to the third chamber, and second duct means connecting the first, second and third chambers with each other in such a manner that the hot gas can flow from the second chamber in a predetermined sequence to one of the other chambers and from there to the remaining one of the other chambers.

Figure 2:
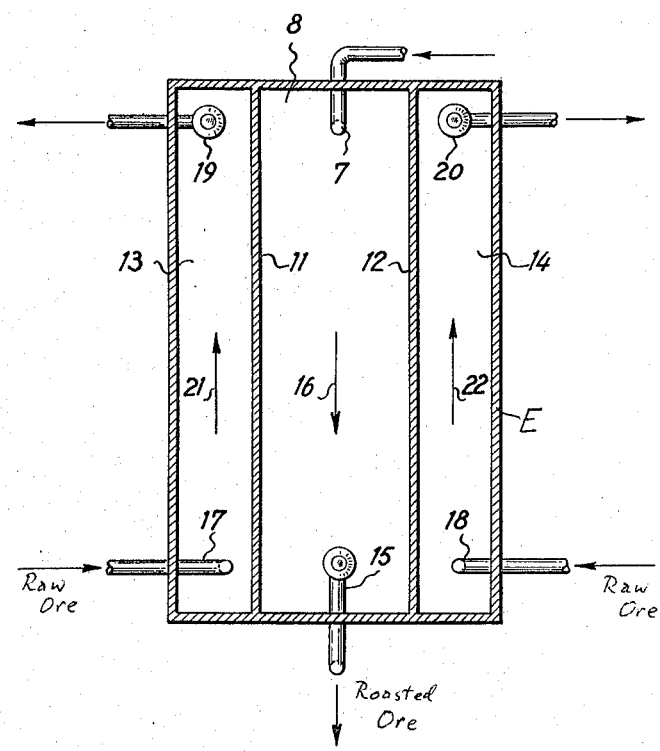
Figure 4:
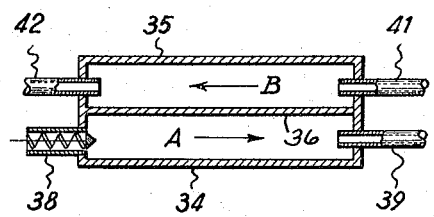
Figure 3:
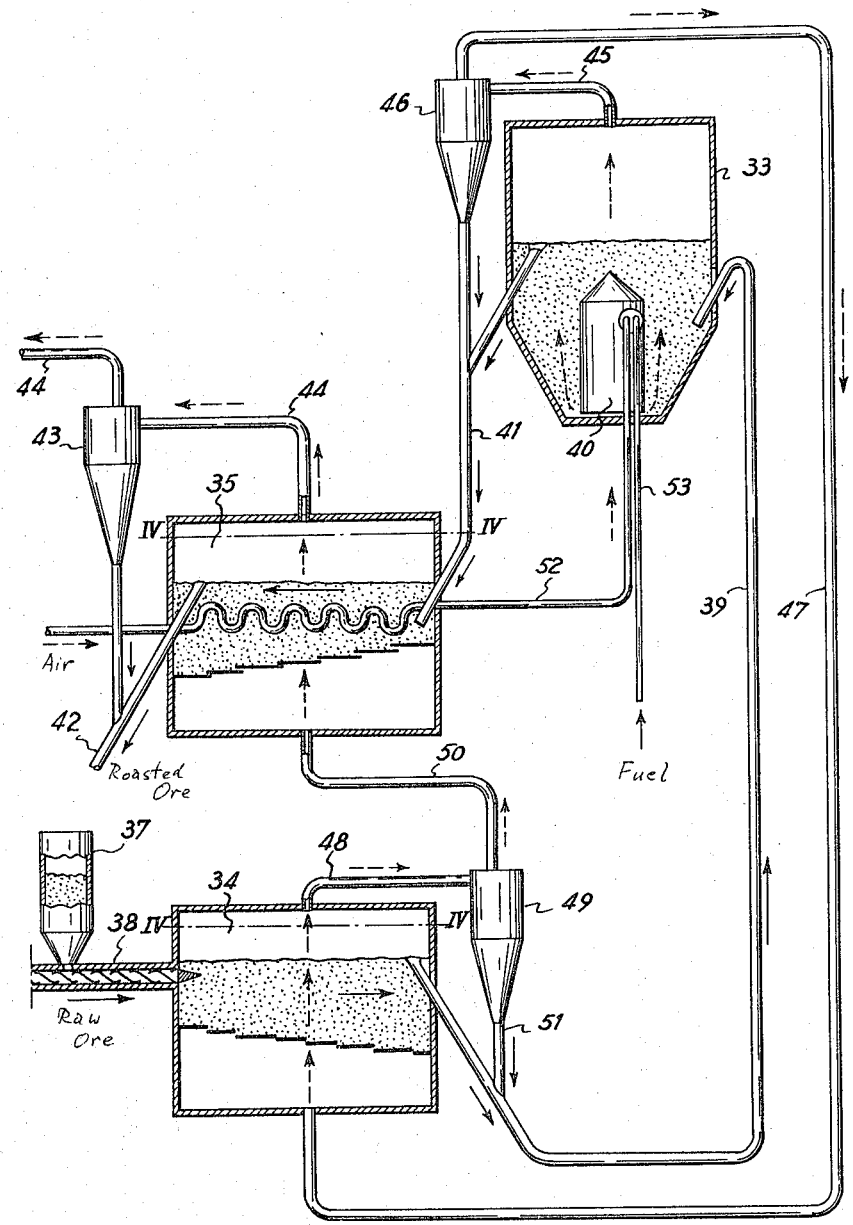

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic illustration of an apparatus for magnetizing roasting ores in accordance with the invention wherein the transfer of heat from the reduced hot ore to the cold ore which is being introduced is effected within an enclosure divided into three compartments separated from each other by vertical and parallel partitions, and in which the fluidizing gas stream passes first through the middle compartment containing the hot materials and then fluidizes the material to be heated and contained in the outer or lateral compartments;

FIG. 2 is a plan view in section taken along line II—II of FIG. 1 of the enclosure and its compartments as shown in FIG. 1 and in which the heat exchange takes place;

FIG. 3 is a diagrammatic elevation showing an apparatus for magnetizing roasting of ore in accordance with the invention wherein the transfer of heat from the reduced hot ore to the entering cold ore is effected in an enclosure divided into two compartments wherein the flow of the fluidizing gas goes from a bed of cold material to a bed of hot material; and FIG. 4 is a plan view in section along lines IV—IV of FIG. 3 of the enclosure in which the heat recuperation takes place.

Referring to FIG. 1, the apparatus according to the invention comprises a chamber 1 into which the pulverulent ore, already heated as will be described further below, is introduced through duct 2 and from which it is removed through duct 3, the ore being fluidized without the use of a grate in a bed 4 by means of hot gases which issue from the lower end of a combustion chamber 5 supplied with fuel through the duct 6. This chamber 5 is completely submerged in the fluidized bed in order to facilitate and to improve the heat exchange. The reduced hot ore is introduced from the duct 3 at 7 into a chamber 8 located above a grate 9 where it is fluidized to form a bed 10.

As a matter of fact, the chamber 8 is the middle compartment in an enclosure E which is subdivided by partitions 11 and 12 into three compartments 13, 8 and 14 each containing a grate 9′, 9 and 9″, respectively, for the purpose of fluidization.

FIG. 2 which is a plan view in section taken along the line II—II of FIG. 1 shows more clearly the compartments 13, 8 and 14.

As can be seen from FIG. 2, the duct 3 through which the reduced, hot ore is introduced into chamber 8 at 7 terminates at one end of this compartment while the outlet duct 15 for this material is arranged at the opposite end of this chamber 8 so that within the fluidized bed 10 a stream of material directed in accordance with the arrow 16 is established.

The ore to be treated is introduced into the compartments 13 and 14 at 17 and 18 and is removed therefrom at 19 and 20 i.e. at opposite ends so that in these compartments a flow of material is established as indicated by the arrows 21 and 22. The ore which issues at 19 and 20 is introduced as shown by FIG. 1 into the input duct 2 of the chamber 1 where the actual magnetizing roasting takes place. The hot gases which result from the combustion in the combustion chamber 5 fluidize and reduce the ore in the bed 4 and are thereafter introduced through a duct 23 into the space below the fluidization grate 9 of the compartment 8 and are gathered at the top of this compartment through a duct 24 whereby they are introduced into a centrifugal type dust separator 25, and from there they are re-introduced through a duct 26 into the space below the fluidization grates 9' and 9" in the compartments 13 and 14, respectively. There the gases fluidize the cold ore while at the same time transferring thereto a great portion of their sensible heat. The ducts 27 and 28 catch these gases at the tops of the compartments 13 and 14 and guide them to a dust separator 29 from where they may be released to the surrounding atmosphere through a duct 30.

The ore dust separated in and furnished by the separators 25, 29 are re-introduced through ducts 31 and 32, respectively, into the outlet tube system of the compartments from where this dust originated.

It will be understood easily that the ore to be treated and flowing by fluidization through the compartments 13 and 14 receives the heat which is available at the outlet of the chamber 1 in two ways: first, by heat exchange across the partitions 11 and 12 like in any normal heat exchanger, and additionally by direct transmission by the contact with the hot gases which are introduced in order to fluidize this ore.

FIG. 3 illustrates in a schematic way the system of connections in an installation for treating ores and comprising a reactor chamber 33 for magnetizing roasting pulverulent ore and a heat exchanger system comprising two compartments 34 and 35. Only for the purpose of the clarity of the illustrations these two compartments are shown separate from each other in FIG. 3 while in fact they constitute compartments of a unitary enclosure which can be seen from FIG. 4 which is a plan view of the heat exchanger system in a section taken along the lines IV—IV of FIG. 3. Thus, it can be seen that these two compartments are separated from each other only by a vertical wall 36 across which the heat exchange takes place.

The ore to be treated is supplied from a reservoir 37. A screw conveyor 38 introduces this ore into the compartment 34 of the heat exchanger where it is fluidized and preheated while it moves in the direction of the arrow A. After moving through the compartment 34 it arrives through a duct 39 at the roasting chamber 33 where it is simultaneously fluidized by the hot gases delivered by a burner 40 submerged in the bed of material.

The hot ore which is partly reduced leaves the reactor 33 through a duct 41 and enters the compartment 35 of the heat exchanger where it is fluidized and cooled while it moves through this compartment in accordance with the arrow B. Hereafter it is removed from the compartment 35 through a duct 42 into which are also introduced the dust coming from the centrifugal separator 43. This separator has the task of cleaning the fluidization gas which leaves the compartment 35 through duct 44.

The sequence of passage of gas through the different fluidized beds of ore differs from that which has been described in the first example. In the present case the flow of hot gases delivered by the burner or combustion chamber 40 passes through the ore bed in the course of the roasting operation and enters thereafter through a duct 45 into a dust separator 46 from where it is led through a duct 47 into the space below a fluidizing grate in the compartment 34. There this hot gas fluidizes and heats the ore entering the apparatus. Hereafter this stream of gas passes through a duct 48 into a second dust separator 49 and from there through a duct 50 in order to be introduced into the space below the fluidization grate of the hot ore in the compartment 35. The dust coming from the compartment 34 and separated by the separator 49 is reintroduced into the path of the moving ore by means of a duct 51.

As is shown by FIG. 3 the fluidization grates in the compartments 34 and 35 are composed of flat elements which partly overlap each other without touching each other. In view of this construction these grates constitute a sloping series of steps and it is advisable in the interest of executing the invention to arrange these grates in such a manner that the inclination of the slop of one grate is opposite to that of the other and that the downward inclination corresponds to the direction of flow of the pulverulent material.

In FIG. 3 ducts 52 and 53 are shown which serve for the introduction of air and fuel into the combustion chamber 40. As can be seen from FIG. 3 the air duct 52 passes across the bed of hot material in the compartment 35 whereby the combustion air is pre-heated.

If the arrangement according to FIG. 3 is compared with the embodiment according to FIGS. 1 and 2, it can be seen that the cold ore is supplied in the present example with somewhat more heat by the fluidizing gases and less by heat exchange across the partitions because the hot ore is fluidized in the compartment 35 by the same gases which have previously passed through the compartment 34 i.e., after they have been somewhat cooled down. As a whole, the ore entering the duct 39 has received in the compartment 34 somewhat less calories than is the case in the first described example, but in the duct 44 gas of higher temperature is available and may then serve for drying the raw ore in a crusher.

It stands to reason that all the above-described components of the system, the enclosures, chambers, ducts, dust separators, etc., should be carefully insulated against loss of heat into the atmosphere which can be done in a conventional manner and evidently does not require illustration in the drawings. This insulation is designed for reducing heat losses as much as possible.

Here below follows an example of magnetizing roasting iron ore, in order to demonstrate the advantage of the method according to this invention in terms of thermal economy and with regard to the operation of the process.

In this example, the ore is a comparatively poor lime containing ore found in Lorraine (France) and containing about 12% of siderite and contains in chemical terms:

| | Percent |
|---|---|
| Fe | 30.6 |
| $SiO_2$ | 5.8 |
| CaO | 19.4 |
| $Al_2O_3$ | 3.9 |
| $H_2O$ | 6.0 |
| $CO_2$ | 17.0 |
| $Fe^{++}$ | 9.4 |

The roasting is carried out by using the system illustrated by FIG. 3. The fluidizing gases are formed by the combustion of fuel oil in the presence of air which latter has been preheated in the coil submerged in the ore passing through the compartment 35. The gases leave the apparatus through duct 44 at a temperature of 350° C. and the roasted materials leave the apparatus through duct 42 at a temperature of 300° C. The total consumption of heat in the apparatus is equal to 210,000 kilogram-calories per ton of dry ore entering the apparatus. This amount of heat is composed as follows:

|  | Kilogram-Calories |
|---|---|
| Endothermic requirements: (Decomposition of the hydrates, of the siderite, and reduction) | 90,000 |
| Sensible heat in the delivered solid products | 53,000 |
| Sensible heat of the gases leaving the apparatus | 40,000 |
| Thermal losses | 27,000 |
|  | 210,000 |

It can be seen that the method according to the invention makes it possible to carry out a magnetizing roasting ores with a thermal consumption which is extremely low namely only 210,000 kilogram-calories per ton, a low figure never reached by any known process as far as we know.

The apparatus illustrated in the drawings also constitute part of this invention. However, it is not believed that it is necessary to describe separately the structure of these arrangements because in the course of describing the process the arrangements according to FIGS. 1, 2 and to FIGS. 3, 4 have been fully described.

It will be understood that each of the elements described above, or two or more together, may also find a useful application in other types of a method and apparatus for roasting ore by fluidization, differing from the types described above.

While the invention has been illustrated and described as embodied in a method and apparatus for roasting ore by fluidization with maximum thermal economy, it is not intended to be limited to the details shown, since various modifications and structural changes may be made without departing in any way from the spirit of the present invention except as limited by the claims.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of roasting pulverulent ore, the steps of: establishing at least a first, a second and a third bed of pulverulent ore separate from each other; providing for separation between said first and third bed by a partition wall therebetween; introducing a continuous stream of hot gas successively into each of said beds for fluidizing and heating the pulverulent ore in said beds and for causing a flow of fluidized pulverulent ore at least in said first and third bed in substantially horizontal direction along said partition wall; causing heat exchange between said first and third beds across said partition wall; producing said stream of hot gas by at least partial combustion of a fuel at a predetermined point within the second one of said beds; and causing said fluidized pulverulent ore to flow from said first bed to said second bed and from said second bed to said third bed while introducing raw pulverulent ore into said first bed and removing roasted pulverulent ore from said third bed.

2. In a method of magnetizing roasting pulverulent iron ore, the steps of: establishing at least a first, a second and a third bed of pulverulent ore separate from each other; providing for separation between said first and third bed by a partition wall therebetween; introducing a continuous stream of hot gas successively into each of said beds for fluidizing and heating the pulverulent ore in said beds and for causing a flow of fluidized pulverulent ore at least in said first and third bed in substantially horizontal direction along said partition wall; causing heat exchange between said first and third beds across said partition wall; producing said stream of hot gas by at least partial combustion of a fuel at a predetermined point within the second one of said beds; and causing said fluidized pulverulent ore to flow from said first bed to said second bed and from said second bed to said third bed while introducing raw puverulent ore into said first bed and removing roasted pulverulent ore from said third bed.

3. In a method of magnetizing roasting pulverulent iron ore, the steps of: establishing at least a first, a second and a third bed of pulverulent ore separate from each other; providing for separation between said first and third bed by a partition wall therebetween; introducing a continuous stream of hot reducing gas successively into each of said beds for fluidizing, reducing and heating the pulverulent ore in said beds and for causing a flow of fluidized pulverulent ore at least in said first and third bed in substantially horizontal direction along said partition wall; causing heat exchange between said first and third beds across said partition wall; producing said stream of hot gas by at least partial combustion of a fuel at a predetermined point within the second one of said beds; and causing said fluidized pulverulent ore to flow from said first bed to said second bed and from said second bed to said third bed while introducing raw pulverulent ore into said first bed and removing roasted pulverulent ore from said third bed.

4. In a method of roasting pulverulent ore, the steps of: establishing at least a first, a second and a third bed of pulverulent ore separate from each other; providing for separation between said first and third bed by a partition wall therebetween; introducing a continuous stream of hot gas successively into said second, third and first beds for fluidizing and heating the pulverulent ore in said beds and for causing a flow of fluidized pulverulent ore at least in said first and third bed in substantially horizontal direction along said partition wall; causing heat exchange between said first and third beds across said partition wall; producing said stream of hot gas by at least partial combustion of a fuel at a predetermined point within the second one of said beds; and causing said fluidized pulverulent ore to flow from said first bed to said second bed and from said second bed to said third bed while introducing raw pulverulent ore into said first bed and removing roasted pulverulent ore from said third bed.

5. In a method of magnetizing roasting pulverulent iron ore, the steps of: establishing at least a first, a second and a third bed of pulverulent ore separate from each other; providing for separation between said first and third bed by a partition wall therebetween; introducing a continuous stream of hot gas successively into said second, third and first beds for fluidizing and heating the pulverulent ore in said beds and for causing a flow of fluidized pulverulent ore at least in said first and third bed in substantially horizontal direction along said partition wall; causing heat exchange between said first and third beds across said partition wall; producing said stream of hot gas by at least partial combustion of a fuel at a predetermined point within the second one of said beds; and causing said fluidized pulverulent ore to flow from said first bed to said second bed and from said second bed to said third bed while introducing raw pulverulent ore into said first bed and removing roasted pulverulent ore from said third bed.

6. In a method of magnetizing roasting pulverulent iron ore, the steps of: establishing at least a first, a second and a third bed of pulverulent ore separate from each other; providing for separation between said first and third bed by a partition wall therebetween; introducing a continuous stream of hot reducing gas successively into said second, third and first beds for fluidizing, reducing and heating the pulverulent ore in said beds and for causing a flow of fluidized pulverulent ore at least in said first and third bed in substantially horizontal direction along said partition wall; causing heat exchange between said first and third beds across said partition wall; producing said stream of hot gas by at least partial combustion of a fuel at a predetermined point within the second one of said beds; and causing said fluidized pulverulent ore to flow from said first bed to said second bed and from said second bed to said third bed while introducing raw pulverulent ore into said first bed and removing roasted pulverulent ore from said third bed.

7. In a method of roasting pulverulent ore, the steps of: establishing at least a first, a second and a third bed of pulverulent ore separate from each other; providing for separation between said first and third bed by a partition wall therebetween; introducing a continuous stream of hot gas successively into said second, first and third beds for fluidizing and heating the pulverulent ore in said beds and for causing a flow of fluidized pulverulent ore at least in said first and third bed in substantially horizontal direction along said partition wall; causing heat exchange between said first and third beds across said partition wall; producing said stream of hot gas by at least partial combustion of a fuel at a predetermined point within the second one of said beds; and causing said fluidized pulverulent ore to flow from said first bed to said second bed and from said second bed to said third bed while introducing raw pulverulent ore into said first bed and removing roasted pulverulent ore from said third bed.

8. In a method of magnetizing roasting pulverulent iron ore, the steps of: establishing at least a first, a second and a third bed of pulverulent ore separate from each other; providing for separation between said first and third bed by a partition wall therebetween; introducing a continuous stream of hot gas successively into said second, first and third beds for fluidizing and heating the pulverulent ore in said beds and for causing a flow of fluidized pulverulent ore at least in said first and third bed in substantially horizontal direction along said partition wall; causing heat exchange between said first and third beds across said partition wall; producing said stream of hot gas by at least partial combustion of a fuel at a predetermined point within the second one of said beds; and causing said fluidized pulverulent ore to flow from said first bed to said second bed and from said second bed to said third bed while introducing raw pulverulent ore into said first bed and removing roasted pulverulent ore from said third bed.

9. In a method of magnetizing roasting pulverulent iron ore, the steps of: establishing at least a first, a second and a third bed of pulverulent ore separate from each other; providing for separation between said first and third bed by a partition wall therebetween; introducing a continuous stream of hot reducing gas successively into said second, first and third beds for fluidizing, reducing and heating the pulverulent ore at least in said first and third bed in substantially horizontal direction along said partition wall; causing heat exchange between said first and third beds across said partition wall; producing said stream of hot gas by at least partial combustion of a fuel at a predetermined point within the second one of said beds; and causing said fluidized pulverulent ore to flow from said first bed to said second bed and from said second bed to said third bed while introducing raw pulverulent ore into said first bed and removing roasted pulverulent ore from said third bed.

10. In an apparatus for magnetizing roasting pulverutent iron ore, in combination, at least a first, a second and a third chamber separate from one another, each chamber including means for introducing said ore and means for removing said ore therefrom, said first and third chambers forming together a unitary enclosure divided by partition means; means for introducing a stream of hot gas successively into each of said chambers for fluidizing and heating said pulverulent ore therein and for conveying it through said chambers, and particularly through said first and third chambers in a direction along said partition means, first duct means connecting said first chamber with said second chamber and connecting said second chamber with said third chamber for enabling said fluidized ore to flow from said first chamber through said second chamber to said third chamber, and second duct means connecting said first, second and third chambers with each other in such a manner that said hot gas can flow from said second chamber in a predetermined sequence to one of the other chambers and from there to the remaining one of said other chambers.

11. In an apparatus for magnetizing roasting pulverulent iron ore, in combination, at least a first, a second and a third chamber separate from one another, each chamber including means for introducing said ore and means for removing said ore therefrom, said first and third chambers forming together a unitary enclosure divided by partition means; means for introducing a stream of hot gas successively into each of said chambers for fluidizing and heating said pulverulent ore therein and for conveying it through said chambers, and particularly through said first and third chambers in a direction along said partition means, first duct means connecting said first chamber with said second chamber and connecting said second chamber with said third chamber for enabling said fluidized ore to flow from said first chamber through said second chamber to said third chamber, and second duct means connecting said first, second and third chambers with each other in such a manner that said hot gas can flow from said second chamber first to said third chamber and from there to said first chamber.

12. In an apparatus for magnetizing roasting pulverulent iron ore, in combination, at least a first, a second and a third chamber separate from one another, each chamber including means for introducing said ore and means for removing said ore therefrom, said first and third chambers forming together a unitary enclosure divided by partition means; means for introducing a stream of hot gas successively into each of said chambers for fluidizing and heating said pulverulent ore therein and for conveying it through said chambers, and particularly through said first and third chambers in a direction along said partition means, first duct means connecting said first chamber with said second chamber and connecting said second chamber with said third chamber for enabling said fluidized ore to flow from said first chamber through said second chamber to said third chamber, and second duct means connecting said first, second and third chambers with each other in such a manner that said hot gas can flow from said second chamber first to said first chamber and from there to said third chamber.

13. In an apparatus for magnetizing roasting pulverulent iron ore, in combination, at least a first, a second and a third chamber separate from one another, each chamber including means for introducing said ore and means for removing said ore therefrom, said first and third chambers forming together a unitary enclosure divided by partition means; means for introducing a stream of hot gas successively into each of said chambers for fluidizing and heating said pulverulent ore therein and for conveying it through said chambers, and particularly through said first and third chambers in directions opposite to each other, respectively, along said partition means, first duct means connecting said first chamber with said second chamber and connecting said second chamber with said third chamber for enabling said fluidized ore to flow from said first chamber through said second chamber to said third chamber, and second duct means connecting said first, second and third chambers with each other in such a manner that said hot gas can flow from said second chamber in a predetermined sequence to one of the other chambers and from there to the remaining one of said other chambers.

14. In an apparatus for magnetizing roasting pulverulent iron ore, in combination, at least a first, a second and a third chamber separate from one another, each chamber including means for introducing said ore and means for removing said ore therefrom, said first and third chambers forming together a unitary enclosure divided by partition means; means for introducing a stream of hot gas successively into each of said chambers for fluidizing and heating said pulverulent ore therein and for conveying it through said chambers, and particularly through said first and third chambers in directions opposite to each other, respectively, along said partition means, first duct means connecting said first chamber with said second chamber and connecting said second chamber with said third chamber for enabling said fluidized ore to flow from said first chamber through said second chamber to said third chamber, and second duct means connecting said first, second and third chambers with each other in such a manner that said hot gas can flow from second chamber first to said third chamber and from there to said first chamber.

15. In an apparatus for magnetizing roasting pulverulent iron ore, in combination, at least a first, a second and a third chamber separate from one another, each chamber including means for introducing said ore and means for removing said ore therefrom, said first and third chambers forming together a unitary enclosure divided by partition means; means for introducing a stream of hot gas successively into each of said chambers for fluidizing and heating said pulverulent ore therein and for conveying it through said chambers, and particularly through said first and third chambers in directions opposite to each other, respectively, along said partition means, first duct means connecting said first chamber with said second chamber and connecting said second chamber with said third chamber for enabling said fluidized ore to flow from said first chamber through said second chamber to said third chamber, and second duct means connecting said first, second and third chambers with each other in such a manner that said hot gas can flow from said second chamber first to said first chamber and from there to said third chamber.

No references cited.

BENJAMIN HENKIN, *Primary Examiner.*